US009226166B2

(12) United States Patent
Kurz

(10) Patent No.: US 9,226,166 B2
(45) Date of Patent: Dec. 29, 2015

(54) METHOD FOR LOCATION

(75) Inventor: Michael Kurz, Vienna (AT)

(73) Assignee: T-MOBILE INTERNATIONAL AUSTRIA GMBH, Vienna (AT)

( * ) Notice: Subject to any disclaimer, the term of this patent is extended or adjusted under 35 U.S.C. 154(b) by 380 days.

(21) Appl. No.: 13/810,217

(22) PCT Filed: Jul. 7, 2011

(86) PCT No.: PCT/EP2011/003476
§ 371 (c)(1),
(2), (4) Date: Jan. 15, 2013

(87) PCT Pub. No.: WO2012/007151
PCT Pub. Date: Jan. 19, 2012

(65) Prior Publication Data
US 2013/0143576 A1 Jun. 6, 2013

(30) Foreign Application Priority Data

Jul. 16, 2010 (EP) ..................................... 10007384

(51) Int. Cl.
*H04W 24/00* (2009.01)
*H04W 4/02* (2009.01)
(Continued)

(52) U.S. Cl.
CPC ............. *H04W 24/00* (2013.01); *G01S 5/0289* (2013.01); *H04L 67/18* (2013.01); *H04L 67/303* (2013.01);
(Continued)

(58) Field of Classification Search
CPC ....... H04W 64/00; H04W 4/02; H04W 36/32; H04W 36/08; H04W 36/0094; H04W 36/00; H04W 4/025; H04W 4/028; H04W 36/0061; H04W 48/20; H04W 4/021; H04W 64/003; H04W 72/0426; H04W 76/005; H04W 76/02; H04W 76/028; G01S 5/06; G01S 5/14; G01S 19/252; G01S 2013/466; G01S 2013/468; G01S 5/10; G01S 19/51; G01S 5/0242; G01S 5/0263; G01S 5/0268; G01S 5/0284; G01S 5/12; G01C 21/206; H04B 17/27; H04B 17/309; H04B 17/318
See application file for complete search history.

(56) References Cited

U.S. PATENT DOCUMENTS 8,175,186 B1 * 5/2012 Wiss et al. .................... 375/295
2004/0203872 A1 10/2004 Bajikar
(Continued)

FOREIGN PATENT DOCUMENTS

EP 1758355 A2 2/2007
JP 2006135905 A 5/2006
(Continued)

OTHER PUBLICATIONS

Savarese et al., Location in distributed ad-hoc wireless sensor networks, 2001 IEEE International Conference on Acoustics, Speech, and Signal Processing, Proceedings, (ICASSP), Salt Lake City, UT, May 7-11, 2011, pp. 2037-2040.
(Continued)

*Primary Examiner* — Nizar Sivji
(74) *Attorney, Agent, or Firm* — Leydig, Voit & Mayer, Ltd.

(57) ABSTRACT

A method for locating mobile devices in a mobile radio network having first, second, and third mobile devices in first, second, and third locations, includes: transmitting a pilot signal to the second mobile device; measuring a signal strength of the pilot signal; transmitting information related to the signal strength of the pilot signal to the first mobile device; determining the second location relative to the first location based on the information related to the signal strength; transmitting a further pilot signal to the third mobile device; measuring a further signal strength of the further pilot signal; transmitting further information related to the further signal strength to the second mobile device; determining the third location relative to the second location based on the further information related to the further signal strength; and transmitting information related to the third location to the first mobile device.

13 Claims, 4 Drawing Sheets

(51) Int. Cl.
*G01S 5/02* (2010.01)
*H04L 29/08* (2006.01)
*H04W 24/10* (2009.01)
*H04W 48/08* (2009.01)
*H04W 64/00* (2009.01)
*H04W 84/18* (2009.01)

(52) U.S. Cl.
CPC ................ *H04W 4/02* (2013.01); *H04W 24/10* (2013.01); *H04W 48/08* (2013.01); *H04W 64/00* (2013.01); *H04W 84/18* (2013.01)

(56) References Cited

U.S. PATENT DOCUMENTS

2006/0138219 A1* 6/2006 Brzezniak et al. ............ 235/383
2007/0197258 A1* 8/2007 Oda et al. ................... 455/554.2
2008/0086236 A1* 4/2008 Saito et al. .................... 700/245

FOREIGN PATENT DOCUMENTS

| | | |
|---|---|---|
| JP | 2007316028 A | 12/2007 |
| JP | 2008131083 A | 6/2008 |
| JP | 2008206025 A | 9/2008 |
| JP | 2009092594 A | 4/2009 |
| WO | WO 2008082783 A1 | 7/2008 |

OTHER PUBLICATIONS

Krempels et al., Directory-less indoor positioning for WLAN infrastructures extended abstract, Consumer Electronics, 2008, ICSE 2008, IEEE International Symposium on, Apr. 14, 2008 IEEE, Piscataway, NJ, USA, pp. 1-2.

European Patent Office, International Search Report in International Patent Application No. PCT/EP2011/003476 (Nov. 9, 2011).

* cited by examiner

METHOD FOR LOCATION

CROSS-REFERENCE TO RELATED APPLICATIONS

This application is a U.S. National Phase application under 35 U.S.C. §371 of International Application No. PCT/EP2011/003476, filed on Jul. 12, 2011, and claims benefit to European Patent Application No. EP 10007384.0, filed on Jul. 16, 2010. The International Application was published in English on Jan. 19, 2012 as WO 2012/007151 A1 under PCT Article 21(2).

FIELD

The present invention relates to a method, a client, a system, a program and a computer program product for locating mobile telecommunication devices.

BACKGROUND

Wireless carriers, such as cellular telephone service providers, are currently able to determine the location of a wireless device. For example, a cellular telephone user can be tracked by determining the signal strength that is being received by nearby transceiver cells and triangulating the user's position. Also GPS is used to determine positions of mobile devices. However if a person is inside a building this can affect GPS and cellular coverage, leading to distortions in the positioning of a user. What is needed is a method of tracking wireless devices to a greater degree of accuracy.

The prior art knows from WO 2008/082783 A1 a method, apparatus, and electronic device for determining a location of a mobile device. A receiver asynchronously receives an access signal from at least three access points of a wireless local area network with the mobile device. A processor measures access signal strength for the access signal for each access point. A transmitter transmits the access signal strengths to a location server to determine the location of the mobile device. The prior art knows from US 2004/0203872 A1 a mobile client device that determines the mobile device's distance from a transmitting device by measuring the strength of a wireless signal. However, there is no possibility for the mobile client device to locate mobile devices from which the mobile client device does not receive adequate wireless signals, e.g. due to walls between the mobile devices.

The drawback of the prior art is that fixed access points transmitting access signals are needed and/or that a transmission of adequate wireless signals between the mobile devices must be possible. Therefore, the realization is comparatively expensive and inflexible referring to the area in which the mobile device is located.

This is only one drawback of the prior art that is solved by the present invention explained in the following.

SUMMARY

In an embodiment, the present invention provides a method for locating mobile devices in a mobile radio network. The mobile radio network includes a first mobile device in a first location, a second mobile device in a second location, and a third mobile device in a third location. The method includes: transmitting, by the first mobile device, a pilot signal to the second mobile device; measuring, by the second mobile device, a signal strength of the pilot signal; transmitting, by the second mobile device, information related to the signal strength of the pilot signal to the first mobile device; determining, by the first mobile device, the second location relative to the first location based on the information related to the signal strength; transmitting, by the second mobile device, a further pilot signal to the third mobile device; measuring, by the third mobile device, a further signal strength of the further pilot signal; transmitting, by third mobile device, further information related to the further signal strength to the second mobile device; determining, by the second mobile device, the third location relative to the second location based on the further information related to the further signal strength; and transmitting, by the second mobile device, information related to the third location to the first mobile device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
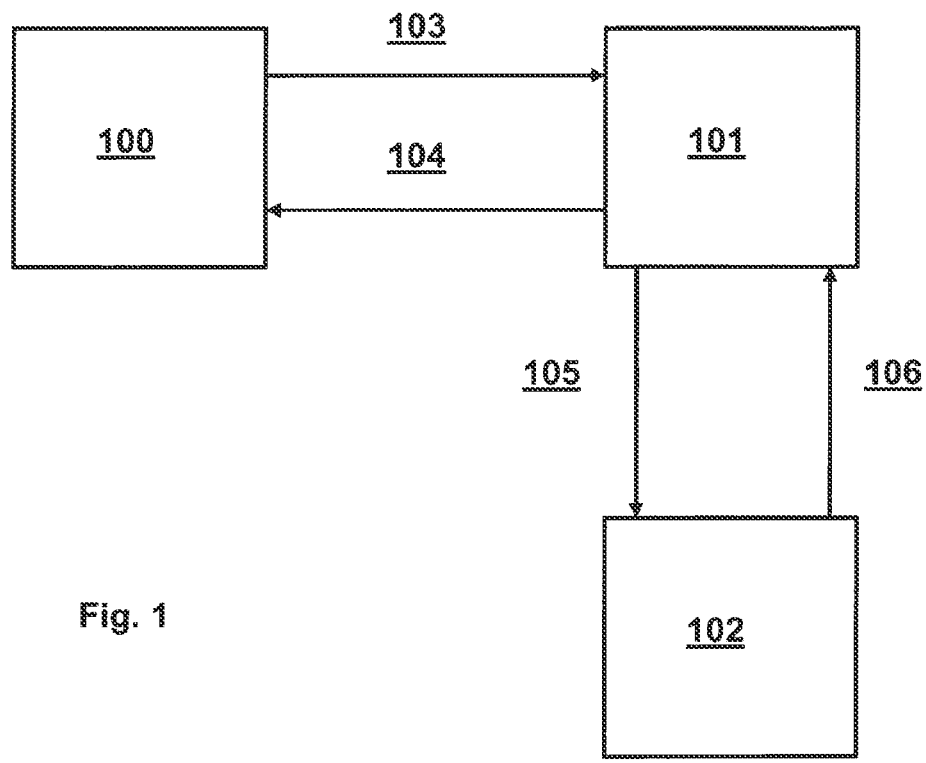
FIG. 1 shows schematically an embodiment of the present invention.

Embodiments of the present invention provide a method, a mobile device, a system, a program and a computer program product for locating in a mobile radio network, wherein the mobile radio network comprises a first mobile device in a first location and a second mobile device in a second location, wherein the method for locating comprises a first step, a second step, a third step, a fourth step, a fifth step, a sixth step, a seventh step, an eighth step and a ninth step, wherein in the first step the first mobile device transmits a pilot signal to the second mobile device wherein in the second step the second mobile device measures a signal strength of the pilot signal, wherein in the third step the second mobile device transmits an information related to the signal strength of the pilot signal to the first mobile device, wherein in the fourth step the first mobile device determines the second location relative to the first location depending on the information related to the signal strength, wherein in the fifth step the second mobile device transmits a further pilot signal to the third mobile device, wherein in the sixth step the third mobile device measures a further signal strength of the further pilot signal, wherein in the seventh step the third mobile device transmits a further information related to the further signal strength to the second mobile device, wherein in the eighth step the second mobile device determines the third location relative to the second location depending on the further information related to the further signal strength, wherein in the ninth step the second mobile device transmits an information related to the third location to the first mobile device.

Therefore, it is advantageously possible to comparatively accurately locate mobile devices without GPS information and/or without the connection with fixed access point of infrastructural networks. The locating of the mobile devices is possible indoors and outdoors and even if the mobile devices are located in different rooms and/or stages of a building. The locating is advantageously possible even if the mobile devices are moving with respect to each other. Therefore, a flexible and a cost efficient location method is being provided. It is advantageously possible to build up e.g. an ad-hoc wireless network between the first mobile device, the second mobile device and the third mobile device. There is no need for a connection with and/or an access to an infrastructural network to provide an efficient method for locating mobile devices. By measuring the (further) signal strength of the received (further) pilot signal in the second (third) mobile device, there is advantageously no need for the first (second) mobile device to know or be aware of the signal strength at which the (further) information related to the (further) signal strength was transmitted. By using the signal strength of the pilot signal for determination of the locations, there is no need for fixed reference points or fixed transmitters. As not only the first mobile device but also the second mobile device are able to transmit (further) pilot signals, and determine locations based on the (further) information related to the (further) signal strength, i.e. of the reported signal strengths, it is possible to locate mobile devices which do not receive the pilot signal of the first mobile device. In case, the pilot signal transmitted from the first mobile device does not reach the third mobile device, e.g. because of a wall between the first mobile device and the third mobile device, the second mobile device is able to locate the third mobile device by transmitting the further pilot signal to the third mobile device and determining the third location based on the reported signal strength. In case, the first mobile device is able to locate the third mobile device, the method provides advantageously two determinations of the third location (one by the first mobile device and one by the second mobile device), which leads to an improved accuracy of locating the third location. By transmitting the further information related to the third location to the first mobile device, it is possible that the first mobile device is aware of the location of the third mobile device even though a direct locating is not possible for the first mobile device. Therefore, the method provides an efficient method for location mobile devices even if the mobile devices are located e.g. in different rooms of a building. The pilot signals and or the information related to the signal strengths are transmitted e.g. permanently or after a request. By transmitting the pilot signals and/or the information related to the signal strengths only by request, power can be saved in case there is currently no need for locating mobile devices.

In the following further embodiments of the present invention are described.

But it will be understood by any person skilled in the art that other modifications or varieties of the invention are possible without departing from the broader spirit of the invention. Such modifications are therefore to be considered as falling within the spirit and the scope of the invention and hence forming part of the invention as herein described or exemplified. Accordingly, the exemplary description is to be regarded in an illustrative sense rather than in a restrictive sense.

According to the present invention it is preferred that the pilot signal and/or the information related to the signal strength are transmitted using Bluetooth, NFC (Near Field Communication), RFID (Radio Frequency Identification), WIMAX (Worldwide Interoperability for Microwave Access) or WLAN (Wireless Local Area Network) connection. In the context of the present invention Bluetooth uses a wireless protocol in the 2, 4 GHz ISM band.

According to the present invention it is thereby advantageously possible to provide a comparatively efficient way of realizing the present invention.

According to the present invention it is preferred that the second location is stored in the first mobile device.

According to the present invention it is thereby advantageously possible to build up e.g. a database in the first mobile device, in which determined locations of the second mobile device are stored.

According to the present invention it is preferred that the first mobile device transmits the second location to the second mobile device, wherein preferably the second location is stored in the second mobile device.

According to the present invention it is thereby advantageously possible to provide the second mobile device with location information.

According to the present invention it is preferred that the pilot signal and/or the information related to the signal strength is encrypted.

According to the present invention it is thereby advantageously possible to ensure that only authorized devices (devices having the decryption key) can be included e.g. in a private network.

According to the present invention it is preferred that the first mobile device determines a further second location of a further second mobile device.

According to the present invention it is thereby advantageously possible to locate a plurality of second mobile devices in order to build up a network e.g. in a hospital.

According to the present invention it is preferred that the first mobile device receives information of a satellite navigation system, e.g. a GPS signal. This information is being provided by wireless or wired connection.

According to the present invention it is thereby advantageously possible to determine not only the relative position but also the absolute position of the second mobile device.

According to the present invention it is preferred that the second mobile device is connected with a location based service. The location based service (LBS) provides e.g. information about locations of special stores in a shopping mall.

According to the present invention it is thereby advantageously possible to provide information to the second mobile device about locations near the determined location of the second mobile device.

According to the present invention it is preferred that the second mobile device responds to the pilot signal with an acoustic and/or optic signal.

According to the present invention it is thereby advantageously possible to provide a "search and find" possibility e.g. if the user of the second mobile device searches the second mobile device.

According to the present invention it is preferred that for better performance, e.g. for a handover procedure, the direction the user of the mobile device is looking to is determined by an internal compass or by a gyro sensor or an acceleration sensor located in the mobile device.

The invention further relates to a mobile device for locating in a mobile radio network according to any of the preceding embodiments.

According to the present invention it is thereby advantageously possible to provide the advantages of the present invention. The mobile device comprises e.g. a transmitter and a receiver of Bluetooth, NFC, RFID, WIMAX or WLAN signals. The mobile device further comprises e.g. a computer unit for determining the locations in dependence of the measured signal strength.

The invention further relates to a system for locating in a mobile radio network, wherein the system comprises a first mobile device in a first location and a second mobile device in a second location, wherein the first mobile device transmits a pilot signal to the second mobile device, wherein the second mobile device measures a signal strength of the pilot signal, wherein the second mobile device transmits an information related to the signal strength of the pilot signal to the first mobile device, wherein the first mobile device determines the second location relative to the first location depending on the information related to the signal strength, wherein the second mobile device determines a third location of a third mobile device, wherein the second mobile device transmits a further pilot signal to the third mobile device, wherein the third mobile device measures a further signal strength of the further pilot signal, wherein the third mobile device transmits a further information related to the further signal strength to the second mobile device, wherein the second mobile device determines the third location relative to the second location depending on the further information related to the further signal strength, wherein the second mobile device transmits the third location of the third mobile device to the first mobile device.

The invention further relates to a program comprising a computer readable program code which, when executed on a computer, causes the computer to perform a method according to any of the preceding embodiments. The invention further relates to a computer program product comprising a computer program stored on a storage medium, wherein the computer program comprises a program code which, when executed on a computer, causes the computer to perform a method according to one of the preceding embodiments.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

The method according to the present invention allows determining the position of mobile devices by using pilot signals. As a further embodiment the pilot signals could be encrypted with defined length of encryption keys. Each mobile device in this case has a special identity (ID) for exact identification. The method according to this invention can not only be used indoors but also outdoors and/or in combination with existing global position systems like e.g. GPS. An exemplary embodiment of this invention is shown in FIG. 1. A first mobile device 100 sends out a pilot signal 103 to the second mobile device 101. The second mobile device 101 reports back to the first mobile device 100 an information 104 related to the received signal strength. The second mobile device 101 sends out a pilot signal 105 to a third mobile device 102 and receives back an information 106 related to the signal strength. The first mobile device 100 determines the second location of the second mobile device 101 in dependence of the reported signal strength with e.g. the help of complex vector analysis. The second mobile device 101 determines the third location of the third mobile device 102 in dependence of the reported signal strength with e.g. the help of complex vector analysis. Advantageously the locations are calculated and do not have to be measured manually. Therefore, it is advantageously possible that the devices can be located even if they move around. According to the present invention, the second mobile device 101 transmits an information related to the third location to the first mobile device 100.

Figure 2:
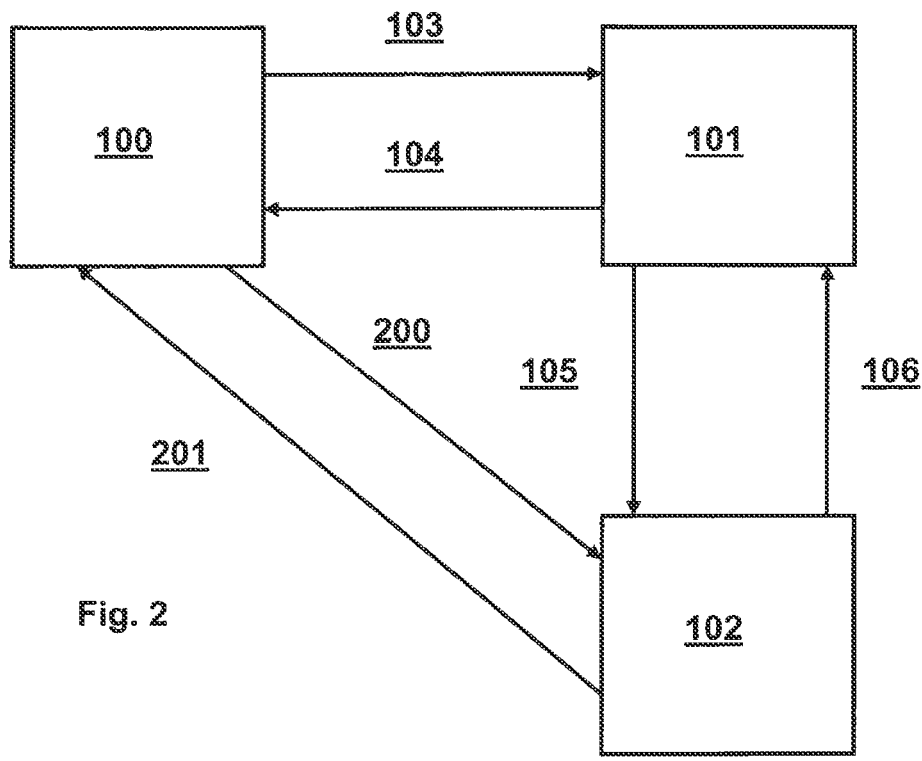
FIG. 2 shows schematically a further embodiment of the present invention.

A further exemplary embodiment of this invention is shown in FIG. 2. The first mobile device 100 sends out the pilot signal 103 to the second mobile device 101. The second mobile device 101 reports to the first mobile device 100 the received signal strength 104. The second mobile device 101 sends out the further pilot signal 105 to the third mobile device 102 and receives back the signal strength 106. The first mobile device 100 determines the location of the second mobile device 101 in dependence of the reported signal strength with e.g. the help of complex vector analysis. The second mobile device 101 determines the location of the third mobile device 102 in dependence of the reported signal strength with e.g. the help of complex vector analysis. Additionally the first mobile device 100 sends out a pilot signal 200 to the third mobile device 102. The third mobile device 102 reports to the first mobile device 100 the received signal strength 201. The first mobile device 100 determines the location of the third mobile device 102 in dependence of the reported signal strength with e.g. the help of complex vector analysis. According to the present invention, the second mobile device 101 transmits an information related to the third location to the first mobile device 100.

Figure 3:
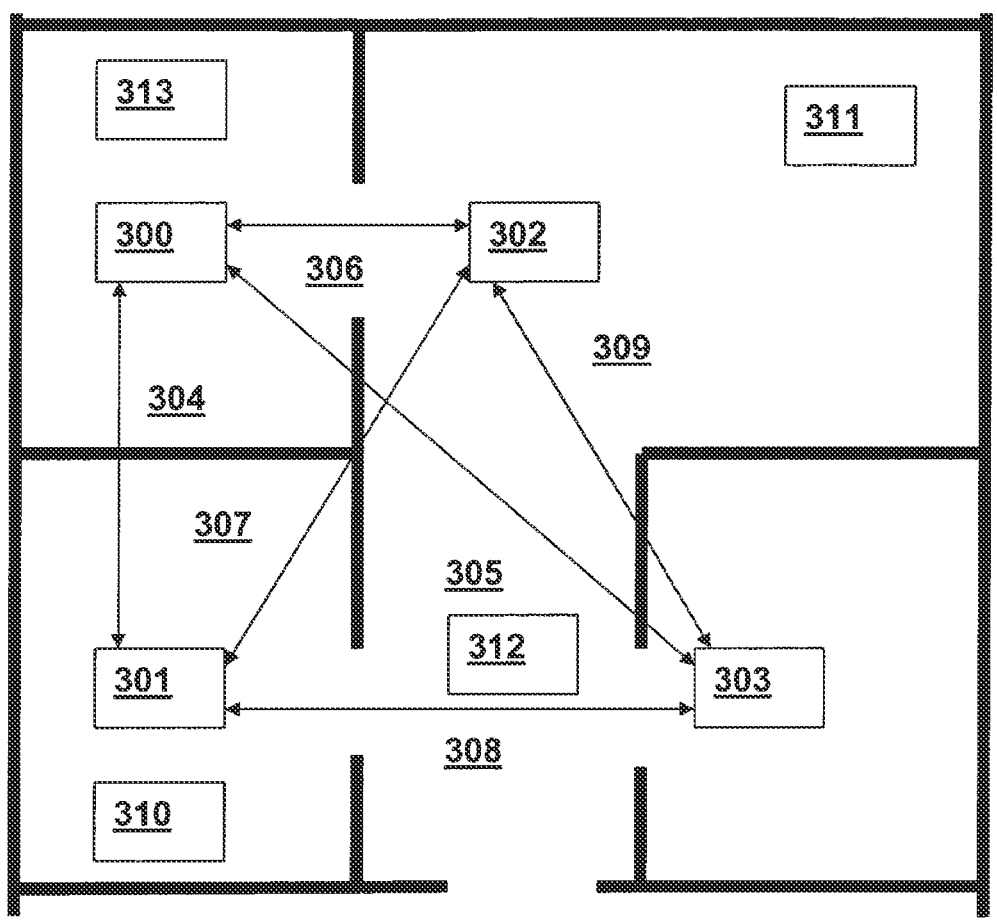
FIG. 3 and FIG. 4 show schematically a further embodiment of the present invention.

A further embodiment of the present invention is shown in FIG. 3. FIG. 3 shows a schematic view of an area, in which the method according to the present invention can be used. This area is e.g. a floor of a building with in this case four rooms connected by three doors. Mobile devices 300, 301, 302, 303 send out pilot signals and mobile clients 310, 311, 312, 313 report the signal strengths. Each mobile device 300, 301, 302, 303 determines the location of the mobile clients 310, 311, 312, 313, wherein e.g. the mobile device 300 sends out a pilot signal to mobile device 313, receives back the signal strength and determines the location of the mobile device 313. Mobile device 301 determines the location of mobile device 310 etc. According to this embodiment, the mobile device 300 informs the mobile device 302 about the location of the mobile device with connection 306, i.e. that the mobile device 300 transmits an information related to the location of the mobile device 313 to the mobile device 302. The mobile device 300 furthermore informs mobile device 301 with connection 304 and the mobile device 303 with connection 305. The mobile device 301 informs the mobile device 303 about the location of the mobile device 310 with connection 308, the mobile device 302 with connection 307 and the mobile device 300 with connection 304. The mobile devices 302 and 303 inform each other and the mobile devices 300 and 301 using connections 306, 307, 309, 305, 308. Therefore, it is advantageously possible to exactly determine locations even if e.g. walls cause attenuation.

Figure 4:
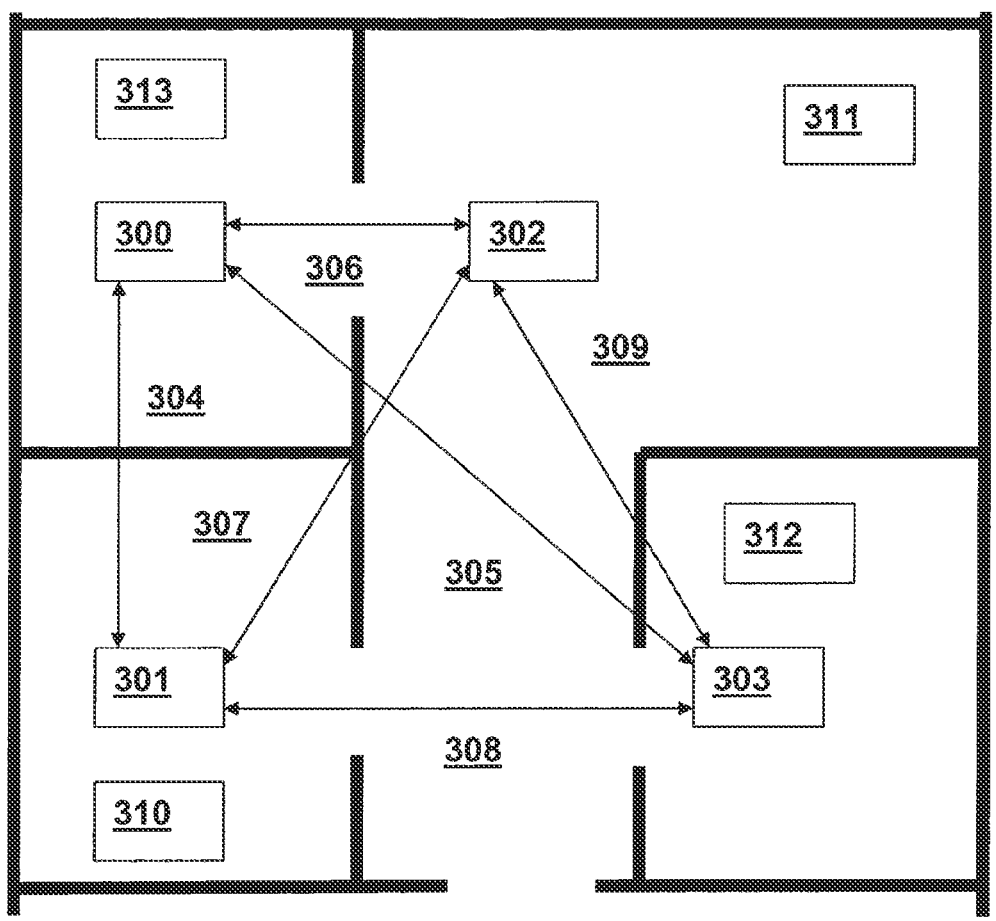

A further embodiment of the present invention is shown in FIG. 4. FIG. 4 shows the scenario of FIG. 3. The explanations and definitions of the embodiment shown in FIG. 3 also apply for FIG. 4. The mobile device 312 has moved from the center room into the room on the right side. In the center room the mobile device was located by the mobile device 302. In the room on the right side the mobile device is located by the mobile device 303. According to this invention a handover between the mobile device 302 and the mobile device 303 is possible so that advantageously exact locating is still possible even if mobile devices move from one room into the other.

According to a further embodiment, the absolute position from the mobile device 300 is available because e.g. the mobile device 300 is located near a window and receives GPS location information. In this case, according to the present invention it is advantageously possible to determine the absolute position of the mobile device 313 and furthermore send the locating information to connected mobile devices 301, 302, 303. It might also be possible to couple (wired or wireless) the mobile device 300 directly to a GPS receiver and configure the mobile device 300 with the exact distance to the GPS receiver.

According to a further embodiment, due to achieved accuracy also Location Based Services (LBS) could be provided to mobile devices, e.g. where is the next pharmacy in a shopping mall.

According to a further embodiment, it is possible to find mobile devices via special lost and found pilot signals. If a user has lost his mobile device 311 the user of the mobile device 302 is trying to find this device via initiating a special lost and found pilot signal to the mobile device 311. The mobile device 311 is responding by e.g. acoustical, light emitting or vibration signals. In addition, the distance or relative coordinates can be displayed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for locating mobile devices in a mobile radio network, the mobile radio network including a first mobile device in a first location, a second mobile device in a second location, and a third mobile device in a third location, the method comprising:
   transmitting, by the first mobile device, a pilot signal;
   measuring, by the second mobile device, a signal strength of the pilot signal;
   transmitting, by the second mobile device, information related to the signal strength of the pilot signal to the first mobile device;
   determining, by the first mobile device, the second location relative to the first location based on the information related to the signal strength; and
   obtaining, by the first mobile device, the third location corresponding to the third mobile device, wherein an obstruction that attenuates or blocks the pilot signal with respect to the third mobile device is located between the third location corresponding to the third mobile device and the first location corresponding to the first mobile device, wherein obtaining the third location further comprises:
   transmitting, by the second mobile device, a further pilot signal to the third mobile device;
   measuring, by the third mobile device, a further signal strength of the further pilot signal;
   transmitting, by the third mobile device, further information related to the further signal strength to the second mobile device;
   determining, by the second mobile device, the third location relative to the second location based on the further information related to the further signal strength; and
   transmitting, by the second mobile device, information related to the third location to the first mobile device;
   wherein at least one of the pilot signal or the information related to the signal strength are transmitted using Bluetooth, NFC (Near Field Communication), RFID (Radio Frequency Identification), WIMAX (Worldwide Interoperability for Microwave Access), or WLAN (Wireless Local Area Network) connection; and
   wherein the method further comprises:
   determining, by an internal compass or gyro sensor in the first mobile device, for a handover procedure, a direction that a user of the first mobile device is looking towards.

2. The method according to claim 1, further comprising:
   transmitting, by the first mobile device, the second location to the second mobile device; and
   storing the second location is stored in at least one of the first or the second mobile device.

3. The method according to claim 1, wherein at least one of the pilot signal or the information related to the signal strength is encrypted.

4. The method according to claim 1, further comprising:
   determining, by the first mobile device, a further second location of a further second mobile device.

5. The method according to claim 1, wherein the first mobile device receives information of a satellite navigation system.

6. The method according to claim 1, wherein the second mobile device is connected with a location based service.

7. The method according to claim 1, wherein the second mobile device responds to the pilot signal with at least one of an acoustic or an optic signal.

8. A system for locating mobile devices in a mobile radio network, the system comprising:
   a first mobile device in a first location;
   a second mobile device in a second location; and
   a third mobile device in a third location;
   wherein the first mobile device is configured to transmit a pilot signal;
   wherein the second mobile device is configured to measure a signal strength of the pilot signal, and to transmit information related to the signal strength of the pilot signal to the first mobile device;
   wherein the first mobile device is further configured to determine the second location relative to the first location based on the information related to the signal strength;
   wherein an obstruction that attenuates or blocks the pilot signal with respect to the third mobile device is located between the third location corresponding to the third mobile device and the first location corresponding to the first mobile device;
   wherein the second mobile device is further configured to transmit a further pilot signal to the third mobile device;
   wherein the third mobile device is configured to measure a further signal strength of the further pilot signal, and to transmit further information related to the further signal strength to the second mobile device; and wherein the second mobile device is further configured to determine the third location relative to the second location based on the further information related to the further signal strength, and to transmit information related to the third location to the first mobile device;

wherein at least one of the pilot signal or the information related to the signal strength are transmitted using Bluetooth, NFC (Near Field Communication), RFID (Radio Frequency Identification), WIMAX (Worldwide Interoperability for Microwave Access), or WLAN (Wireless Local Area Network) connection; and wherein an internal compass or gyro sensor in the first mobile device is configured to determine, for a handover procedure, a direction that a user of the first mobile device is looking towards.

9. One or more non-transitory computer-readable media with computer-executable instructions stored thereon for locating mobile devices in a mobile radio network, the mobile radio network including a first mobile device in a first location, a second mobile device in a second location, and a third mobile device in a third location, the computer-executable instructions, when executed by a processor, causing the following steps to be performed:

transmitting, by the first mobile device, a pilot signal to the second mobile device;

measuring, by the second mobile device, a signal strength of the pilot signal;

transmitting, by the second mobile device, information related to the signal strength of the pilot signal to the first mobile device;

determining, by the first mobile device, the second location relative to the first location based on the information related to the signal strength;

obtaining, by the first mobile device, the third location corresponding to the third mobile device, wherein an obstruction that attenuates or blocks the pilot signal with respect to the third mobile device is located between the third location corresponding to the third mobile device and the first location corresponding to the first mobile device, wherein obtaining the third location further comprises:

transmitting, by the second mobile device, a further pilot signal to the third mobile device;

measuring, by the third mobile device, a further signal strength of the further pilot signal;

transmitting, by third mobile device, further information related to the further signal strength to the second mobile device;

determining, by the second mobile device, the third location relative to the second location based on the further information related to the further signal strength; and transmitting, by the second mobile device, information related to the third location to the first mobile device wherein at least one of the pilot signal or the information related to the signal strength are transmitted using Bluetooth, NFC (Near Field Communication), RFID (Radio Frequency Identification), WIMAX (Worldwide Interoperability for Microwave Access), or WLAN (Wireless Local Area Network) connection; and wherein the computer-executable instructions, when executed by a processor, further cause the following step to be performed:

determining, by an internal compass or gyro sensor in the first mobile device, for a handover procedure, a direction that a user of the first mobile device is looking towards.

10. The method according to claim 1, wherein the obstruction is a wall.

11. A method for locating mobile devices in a mobile radio network, the mobile radio network including a first mobile device in a first location, a second mobile device in a second location, and a third mobile device in a third location, the method comprising:

transmitting, by the first mobile device, a pilot signal;

measuring, by the second mobile device, a signal strength of the pilot signal;

transmitting, by the second mobile device, information related to the signal strength of the pilot signal to the first mobile device;

determining, by the first mobile device, the second location relative to the first location based on the information related to the signal strength; and obtaining, by the first mobile device, the third location corresponding to the third mobile device, wherein an obstruction that attenuates or blocks the pilot signal with respect to the third mobile device is located between the third location corresponding to the third mobile device and the first location corresponding to the first mobile device, wherein obtaining the third location further comprises:

transmitting, by the second mobile device, a further pilot signal to the third mobile device;

measuring, by the third mobile device, a further signal strength of the further pilot signal;

transmitting, by the third mobile device, further information related to the further signal strength to the second mobile device;

determining, by the second mobile device, the third location relative to the second location based on the further information related to the further signal strength; and transmitting, by the second mobile device, information related to the third location to the first mobile device;

wherein at least one of the pilot signal or the information related to the signal strength are transmitted using Bluetooth, NFC (Near Field Communication), RFID (Radio Frequency Identification), WIMAX (Worldwide Interoperability for Microwave Access), or WLAN (Wireless Local Area Network) connection; and wherein at least one of the pilot signal or the information related to the signal strength is encrypted.

12. A system for locating mobile devices in a mobile radio network, the system comprising:

a first mobile device in a first location;

a second mobile device in a second location; and a third mobile device in a third location;

wherein the first mobile device is configured to transmit a pilot signal;

wherein the second mobile device is configured to measure a signal strength of the pilot signal, and to transmit information related to the signal strength of the pilot signal to the first mobile device;

wherein the first mobile device is further configured to determine the second location relative to the first location based on the information related to the signal strength;

wherein an obstruction that attenuates or blocks the pilot signal with respect to the third mobile device is located between the third location corresponding to the third mobile device and the first location corresponding to the first mobile device;

wherein the second mobile device is further configured to transmit a further pilot signal to the third mobile device;

wherein the third mobile device is configured to measure a further signal strength of the further pilot signal, and to transmit further information related to the further signal strength to the second mobile device; and wherein the second mobile device is further configured to determine the third location relative to the second location based on the further information related to the further signal strength, and to transmit information related to the third location to the first mobile device;

wherein at least one of the pilot signal or the information related to the signal strength are transmitted using Bluetooth, NFC (Near Field Communication), RFID (Radio Frequency Identification), WIMAX (Worldwide Interoperability for Microwave Access), or WLAN (Wireless Local Area Network) connection; and wherein at least one of the pilot signal or the information related to the signal strength is encrypted.

13. One or more non-transitory computer-readable media with computer-executable instructions stored thereon for locating mobile devices in a mobile radio network, the mobile radio network including a first mobile device in a first location, a second mobile device in a second location, and a third mobile device in a third location, the computer-executable instructions, when executed by a processor, causing the following steps to be performed:

transmitting, by the first mobile device, a pilot signal to the second mobile device;

measuring, by the second mobile device, a signal strength of the pilot signal;

transmitting, by the second mobile device, information related to the signal strength of the pilot signal to the first mobile device;

determining, by the first mobile device, the second location relative to the first location based on the information related to the signal strength;

obtaining, by the first mobile device, the third location corresponding to the third mobile device, wherein an obstruction that attenuates or blocks the pilot signal with respect to the third mobile device is located between the third location corresponding to the third mobile device and the first location corresponding to the first mobile device, wherein obtaining the third location further comprises:

transmitting, by the second mobile device, a further pilot signal to the third mobile device;

measuring, by the third mobile device, a further signal strength of the further pilot signal;

transmitting, by third mobile device, further information related to the further signal strength to the second mobile device;

determining, by the second mobile device, the third location relative to the second location based on the further information related to the further signal strength; and transmitting, by the second mobile device, information related to the third location to the first mobile device;

wherein at least one of the pilot signal or the information related to the signal strength are transmitted using Bluetooth, NFC (Near Field Communication), RFID (Radio Frequency Identification), WIMAX (Worldwide Interoperability for Microwave Access), or WLAN (Wireless Local Area Network) connection; and wherein at least one of the pilot signal or the information related to the signal strength is encrypted.

* * * * *